United States Patent
Kang et al.

(10) Patent No.: US 9,909,026 B2
(45) Date of Patent: *Mar. 6, 2018

(54) HARD COATING FILM

(71) Applicant: LG CHEM, LTD., Seoul (KR)

(72) Inventors: Joon-Koo Kang, Daejeon (KR); Yeong-Rae Chang, Daejeon (KR); Sung-Don Hong, Daejeon (KR); Soon-Hwa Jung, Daejeon (KR); Eun-Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 265 days.

This patent is subject to a terminal disclaimer.

(21) Appl. No.: 14/422,437

(22) PCT Filed: Jul. 29, 2013

(86) PCT No.: PCT/KR2013/006775
§ 371 (c)(1),
(2) Date: Feb. 19, 2015

(87) PCT Pub. No.: WO2014/030846
PCT Pub. Date: Feb. 27, 2014

(65) Prior Publication Data
US 2015/0225598 A1    Aug. 13, 2015

(30) Foreign Application Priority Data

Aug. 23, 2012  (KR) .................. 10-2012-0092529
Jul. 26, 2013  (KR) .................. 10-2013-0089103

(51) Int. Cl.
| C09D 133/14 | (2006.01) |
| C08L 33/04 | (2006.01) |
| C09D 135/02 | (2006.01) |
| C08J 7/04 | (2006.01) |
| C09D 105/16 | (2006.01) |
| C09D 4/06 | (2006.01) |
| C08J 5/18 | (2006.01) |

(52) U.S. Cl.
CPC .............. *C09D 133/14* (2013.01); *C08J 5/18* (2013.01); *C08J 7/042* (2013.01); *C08J 7/047* (2013.01); *C08L 33/04* (2013.01); *C09D 4/06* (2013.01); *C09D 105/16* (2013.01); *C09D 135/02* (2013.01); *C08J 2333/04* (2013.01); *C08J 2367/02* (2013.01); *C08J 2433/00* (2013.01); *C08J 2433/08* (2013.01); *Y10T 428/24917* (2015.01); *Y10T 428/269* (2015.01); *Y10T 428/2848* (2015.01); *Y10T 442/10* (2015.04)

(58) Field of Classification Search
None
See application file for complete search history.

(56) References Cited

U.S. PATENT DOCUMENTS

| 5,146,531 A | 9/1992 | Shustack |
| 6,489,015 B1 | 12/2002 | Tsuchiya et al. |
| 2004/0081831 A1 | 4/2004 | Shoshi et al. |
| 2005/0136273 A1 | 6/2005 | Hashimoto et al. |
| 2007/0134463 A1* | 6/2007 | Sinha ................. G11B 7/24056 428/64.6 |
| 2007/0178297 A1 | 8/2007 | Takada et al. |
| 2007/0237966 A1 | 10/2007 | Takao et al. |
| 2008/0145673 A1 | 6/2008 | Bonnard |
| 2008/0193722 A1 | 8/2008 | Tanaka |
| 2008/0311351 A1 | 12/2008 | Hsu et al. |
| 2009/0169896 A1 | 7/2009 | Sohn et al. |
| 2009/0202819 A1 | 8/2009 | Asahi et al. |
| 2009/0214871 A1 | 8/2009 | Fukuda et al. |
| 2009/0215919 A1* | 8/2009 | Ito ....................... C08B 37/0015 522/40 |
| 2010/0055377 A1 | 3/2010 | Esaki et al. |
| 2010/0084037 A1 | 4/2010 | Ericsson et al. |
| 2011/0050623 A1* | 3/2011 | Lee ......................... G06F 3/041 345/174 |
| 2011/0077334 A1 | 3/2011 | Oi et al. |
| 2011/0124823 A1* | 5/2011 | Hayashi ................. C08G 18/10 525/424 |
| 2012/0019766 A1 | 1/2012 | Oki et al. |

FOREIGN PATENT DOCUMENTS

| CN | 1286640 C | 11/2004 |
| CN | 102257087 A | 11/2011 |
| EP | 2397527 A1 | 12/2011 |
| EP | 2 840 107 A1 | 2/2015 |
| EP | 2 840 109 A1 | 2/2015 |
| EP | 2 840 110 A1 | 2/2015 |
| EP | 2 842 989 A1 | 3/2015 |
| EP | 2 843 008 A1 | 3/2015 |
| EP | 2857440 A1 | 4/2015 |
| JP | 2000015734 A | 1/2000 |

(Continued)

OTHER PUBLICATIONS

Kazuko et al., JP2011-201087, Machine Translated provided by EPO, accessed Nov. 17, 2015.*
English machine translation of JP2011-110902, EPO, accessed Jan. 31, 2018.*
English machine translation of JP2011-043606, EPO, accessed Jan. 31, 2018.*
English machine translation of JP2006-231845, EPO, accessed Jan. 31, 2018.*
Extended Search Report dated Jan. 29, 2016 of EP Patent Application No. 13830624.6 (9 pages).
Extended Search Report dated Mar. 15, 2016 of EP Patent Application No. 13830681.6 (10 pages).
Extended Search Report dated Apr. 6, 2016 of EP Patent Application No. 13831101.4 (8 pages).
Extended Search Report dated Apr. 6, 2016 of EP Patent Application No. 138313275 (8 pages).
Extended Search Report dated Mar. 11, 2016 of EP Patent Application No. 13830272.4 (7 pages).
Extended Search Report dated Mar. 14, 2016 of EP Patent Application No. 13830709.5 (9 pages).
Extended Search Report dated Apr. 4, 2016 of EP Patent Application No. 13830724.4 (11 pages).

(Continued)

Primary Examiner — Humera N Sheikh
Assistant Examiner — Xiaobei Wang
(74) Attorney, Agent, or Firm — Rothwell, Figg, Ernst & Manbeck, P.C.

(57) ABSTRACT

Disclosed is a hard coating film with high impact resistance and superior physical properties, including high hardness, scratch resistance and transparency, and high processability.

14 Claims, No Drawings

(56) References Cited

FOREIGN PATENT DOCUMENTS

| | | |
|---|---|---|
| JP | 2000-052472 A | 2/2000 |
| JP | 2000-071392 A | 3/2000 |
| JP | 2000-214791 A | 8/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-288787 A | 10/2005 |
| JP | 2006-58574 A | 3/2006 |
| JP | 2006-231845 A | 9/2006 |
| JP | 2006-233167 A | 9/2006 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008116596 A | 5/2008 |
| JP | 2008-138165 A | 6/2008 |
| JP | 2008129130 A | 6/2008 |
| JP | 2008-150484 A | 7/2008 |
| JP | 2008197662 A | 8/2008 |
| JP | 2008-310286 A | 12/2008 |
| JP | 2009-204725 A | 9/2009 |
| JP | 2009204727 A | 9/2009 |
| JP | 2009-241458 A | 10/2009 |
| JP | 2010-017991 A | 1/2010 |
| JP | 2010-052334 A | 3/2010 |
| JP | 2010-053231 A | 3/2010 |
| JP | 2010121013 A | 6/2010 |
| JP | 2010-173234 A | 8/2010 |
| JP | 2010-284910 A | 12/2010 |
| JP | 2011-031457 A | 2/2011 |
| JP | 2011-031527 A | 2/2011 |
| JP | 2011022456 A | 2/2011 |
| JP | 2011504828 A | 2/2011 |
| JP | 2011-043606 A | 3/2011 |
| JP | 2011-046917 A | 3/2011 |
| JP | 2011-075705 A | 4/2011 |
| JP | 2011-110902 A | 6/2011 |
| JP | 2011-178910 A | 9/2011 |
| JP | 2011-201087 A | 10/2011 |
| JP | 2011-246548 A | 12/2011 |
| JP | 2012-081742 A | 4/2012 |
| JP | 4911474 B2 | 4/2012 |
| JP | 2012066477 A | 4/2012 |
| JP | 2013-095108 A | 5/2013 |
| KR | 10-1999-0072670 A | 9/1999 |
| KR | 10-2000-0021805 A | 4/2000 |
| KR | 10-2000-0021806 A | 4/2000 |
| KR | 10-2004-0037081 A | 4/2004 |
| KR | 10-2004-0097189 A | 11/2004 |
| KR | 10-2006-0009194 A | 1/2006 |
| KR | 1020060072072 A | 6/2006 |
| KR | 100730414 B1 | 6/2007 |
| KR | 10-2008-0005839 A | 1/2008 |
| KR | 10-2008-0055698 A | 6/2008 |
| KR | 10-0852562 B1 | 8/2008 |
| KR | 100852561 B1 | 8/2008 |
| KR | 10-2008-0109658 A | 12/2008 |
| KR | 1020090006131 A | 1/2009 |
| KR | 10-0884079 B1 | 2/2009 |
| KR | 10-2009-0044089 A | 5/2009 |
| KR | 1020090045105 A | 5/2009 |
| KR | 1020090047529 A | 5/2009 |
| KR | 10-2009-0063182 A | 6/2009 |
| KR | 1020090061821 A | 6/2009 |
| KR | 10-2009-0073668 A | 7/2009 |
| KR | 10-0905683 B1 | 7/2009 |
| KR | 10-0926220 B1 | 11/2009 |
| KR | 10-2010-0026014 A | 3/2010 |
| KR | 10-2010-0028648 A | 3/2010 |
| KR | 10-2010-0041992 A | 4/2010 |
| KR | 10-2010-0055160 A | 5/2010 |
| KR | 1020100045997 A | 5/2010 |
| KR | 10-2010-0129512 A | 12/2010 |
| KR | 10-2010-0132786 A | 12/2010 |
| KR | 10-2011-0034324 A | 4/2011 |
| KR | 10-2011-0037622 A | 4/2011 |
| KR | 101028463 61 | 4/2011 |
| KR | 10-2011-0058743 A | 6/2011 |
| KR | 10-2011-0071480 A | 6/2011 |
| KR | 10-2011-0103885 A | 9/2011 |
| KR | 1020110119704 A | 11/2011 |
| KR | 10-2011-0130142 A | 12/2011 |
| KR | 10-2012-0002366 A | 1/2012 |
| KR | 10-1127952 B1 | 3/2012 |
| KR | 101114932 B1 | 3/2012 |
| KR | 10-2012-0058635 A | 6/2012 |
| KR | 10-1150719 B1 | 6/2012 |
| KR | 10-1168073 B1 | 7/2012 |
| KR | 10-2012-0136597 A | 12/2012 |
| KR | 101295325 B1 | 8/2013 |
| TW | 200907401 A | 2/2009 |
| TW | 201041985 A | 12/2010 |
| TW | 201130880 A | 9/2011 |
| TW | 201202403 A | 1/2012 |
| TW | I357922 B | 2/2012 |
| WO | 2006046855 A1 | 5/2006 |
| WO | 2006-088200 A1 | 8/2006 |
| WO | WO-2008-098872 A1 | 8/2008 |
| WO | 2011/105532 A1 | 9/2011 |
| WO | 2012/026475 A1 | 3/2012 |
| WO | 2012/060145 A1 | 5/2012 |

OTHER PUBLICATIONS

Shin-Nakamura Chemical Industry Co., Ltd., [Sep. 20, 2016]—Product List, Photo curable monomers/oligomers: Urethane acrylates with English translation (2 pages).

Third Party Observation dated Oct. 14, 2016 of the corresponding Japanese Patent Application No. 2015-528383 (9 pages).

Communication from European Patent Office in corresponding application EP 13797819.3 dated Dec. 17, 2015, 12 pages.

Written Opinion and Search Report issued in related international application No. PCT/KR2013/006778 dated Oct. 17, 2013 along with English translation, 17 pages.

Written Opinion and Search Report issued in related international application No. PCT/KR2013/006773 dated Oct. 22, 2013 along with English translation, 20 pages.

Written Opinion and Search Report issued in related international application No. PCT/KR2013/006775 dated Oct. 25, 2013 along with English translation, 25 pages.

Written Opinion and Search Report issued in related international application No. PCT/KR2013/006780 dated Nov. 27, 2013 along with English translation, 20 pages.

Written Opinion and Search Report issued in related international application No. PCT/KR2013/006781 dated Nov. 27, 2013 along with English translation, 18 pages.

Written Opinion and Search Report issued in related international application No. PCT/KR2013/006782 dated Nov. 27, 2013 along with English translation, 20 pages.

"Ciba TINUVIN 900 Light Stabilizer", Ciba Specialty Chemicals, 1997, pp. 1-3.

* cited by examiner

HARD COATING FILM

CROSS REFERENCE TO RELATED APPLICATIONS

This application is a 35 U.S.C. § 371 National Phase Entry Application from PCT/KR2013/006775, filed Jul. 29, 2013, and designating the United States, which claims priority under 35 U.S.C. § 119 to Korean Patent Application No. 10-2013-0089103, filed Jul. 26, 2013 and Korean Patent Application No. 10-2012-0092529, filed Aug. 23, 2012, which are incorporated herein in their entireties.

BACKGROUND OF THE INVENTION

1. Field of the Invention

The present invention relates to a hard coating film, and, more particularly, to a hard coating film having high hardness and superior physical properties.

2. Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of mobile applications being heavy due to the weight thereof and glass being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a hard coating layer.

First of all, increasing the thickness of the hard coating layer is considered as an approach to improving the surface hardness thereof. In fact, the hard coating layer should be of a minimal thickness to ensure the surface hardness of the hard coating layer. As the hard coating layer increases in thickness, the surface hardness thereof may become higher. However, a thicker hard coating layer, although increasing the surface hardness, is more prone to setting shrinkage which leads to wrinkling or curling with the concomitant production of cracks or exfoliations, and thus thick hard coating layers are difficult to employ in practice.

Recently, some methods have been proposed for conferring a high hardness on hard coating films, without the problems of cracking and setting shrinkage-induced curling.

Korean Patent Application Publication No. 2010-0041992 discloses a hard coating film composition, free of monomers, comprising a binder resin based on ultraviolet-curable polyurethane acrylate oligomers. However, this hard coating film has a pencil hardness of about 3H, and thus the strength thereof is not sufficient to be a substitute for glass panels for displays.

SUMMARY OF THE INVENTION

Accordingly, the present invention has been made keeping in mind the above problems occurring in the prior art, and an object of the present invention is to provide a hard coating film which retains high hardness and superior physical properties.

In order to accomplish the above object, the present invention provides a hard coating film, comprising:

a supporting substrate;
a first hard coating layer, formed on one side of the supporting substrate and including a first photocurable crosslinking copolymer; and
a second hard coating layer, formed on the other side of the supporting substrate and including a second photocurable crosslinking copolymer and inorganic particles dispersed in the second photocurable crosslinking copolymer.

According to the present invention, the hard coating film can exhibit high hardness, impact resistance, scratch resistance and transparency, and can thus be usefully applied to touch panels of mobile terminals, smart phones or tablet PCs, and as a cover or device panel for various displays, in substitution for glass.

DESCRIPTION OF THE PREFERRED EMBODIMENTS

The present invention addresses a hard coating film, comprising:

a supporting substrate;
a first hard coating layer, formed on one side of the supporting substrate and including a first photocurable crosslinking copolymer; and
a second hard coating layer, formed on the other side of the supporting substrate and including a second photocurable crosslinking copolymer and inorganic particles dispersed in the second photocurable crosslinking copolymer.

All of the terms used in the specification are taken only to illustrate embodiments, and are not intended to limit the present invention. As used herein and in the appended claims, the singular forms "a," "an," and "the" include plural references unless the context clearly dictates otherwise.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, a detailed description will be given of a hard coating film according to the present invention.

The present invention pertains to a hard coating film, comprising a supporting substrate; a first hard coating layer, formed on one side of the supporting substrate and including a first photocurable crosslinking copolymer; and a second hard coating layer, formed on the other side of the supporting substrate and including a second photocurable crosslinking copolymer and inorganic particles dispersed in the second photocurable crosslinking copolymer.

In the hard coating film of the present invention, any material for the supporting substrate on which the first and second hard coating layers are formed may be used so long as it is a typical transparent plastic resin, without particular limitations in terms of methods or materials for manufacturing supporting substrates such as stretched or unstretched films. More specifically, according to an embodiment of the present invention, the supporting substrate may include, for example, films made of polyester such as polyethyleneterephthalate (PET), polyethylene such as ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA), a fluorine resin, etc. The supporting substrate may be provided in the form of a single layer structure, or a multilayer structure including two or more layers composed of the same or different materials, as necessary, but is not particularly limited.

In one embodiment of the present invention, the supporting substrate may be a multilayered substrate made of polyethyleneterephthalate (PET) or a substrate including two or more layers resulting from co-extrusion of polymethylmethacrylate (PMMA)/polycarbonate (PC).

In another embodiment of the present invention, the supporting substrate may be a substrate including a copolymer of polymethylmethacrylate (PMMA) and polycarbonate (PC).

Although the thickness of the supporting substrate is not particularly limited, it may fall in the range of about 30 to about 1,200 μm, or about about 50 to 800 μm.

The hard coating film of the present invention includes first and second hard coating layers respectively formed on both sides of the supporting substrate.

The first hard coating layer includes a first photocurable crosslinking copolymer.

The first photocurable crosslinking copolymer may be a copolymer in which a mono- to hexa-functional acrylate monomer is crosslinked with a photocurable elastic polymer.

As used herein, the term "acrylate" is intended to encompass acrylate, methacrylate, and derivatives thereof with various substituents.

As used herein, the term "photocurable elastic polymer" refers to a polymer which is elastic and contains a functional group that undergoes UV light-triggered crosslink polymerization.

According to an embodiment of the present invention, the photocurable elastic polymer may have an elongation of about 15% or more, for example, about 15 to about 200%, about 20 to about 200%, or about 20 to about 150%, as measured by ASTM D638.

The photocurable elastic polymer is crosslink polymerized with the mono- to hexa-functional acrylate monomer and then cured to form a first hard coating layer, conferring flexibility and impact resistance to the first hard coating layer.

According to an embodiment of the present invention, the photocurable elastic polymer may be a polymer or oligomer having a weight average molecular weight of about 1,000 to about 600,000 g/mol or about 10,000 to about 600,000 g/mol.

The photocurable elastic polymer may include at least one selected from the group consisting of polycaprolactone, a urethane acrylate polymer and polyrotaxane.

Among the polymers usable as the photocurable elastic polymer, polycaprolactone is formed by the ring-opening polymerization of caprolactone, and has excellent physical properties such as flexibility, impact resistance, durability and the like.

A urethane acrylate polymer has excellent elasticity and durability because of a urethane bond retained therein.

Polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include a rotaxane compound comprising a cyclic moiety (macrocycle) in which lactone compounds with a (meth)acrylate moiety conjugated to the end thereof are bonded to each other; a thread moiety held within the macrocycle; and stoppers provided at both ends of the thread moiety so as to prevent dissociation of the macrocycle.

No particular limitations are imposed on the macrocycle if it is large enough to surround the thread moiety. The macrocycle may include a functional group such as a hydroxyl group, an amino group, a carboxyl group, a thiol group, an aldehyde group or the like, which may react with other polymers or compounds. Specific examples of the macrocycle may include α-cyclodextrin, β-cyclodextrin, γ-cyclodextrin and mixtures thereof.

Furthermore, the thread may be used without limitation as long as it is generally linear in shape with a predetermined weight or greater. Preferably, a polyalkylene compound or a polylactone compound may be used in the thread. Specifically, a polyoxyalkylene compound including an oxyalkylene repetitive unit of 1 to 8 carbon atoms or a polylactone compound including a lactone repetitive unit of 3 to 10 carbon atoms may be used in the thread.

Meanwhile, the stopper may be appropriately adjusted depending on the characteristics of the rotaxane compound to be prepared. For example, the stopper may include at least one selected from the group consisting of a dinitrophenyl group, a cyclodextrin group, an amantane group, a trityl group, a fluorescein group and a pyrene group.

In the hard coating film of the present invention, as the first hard coating layer is formed by photocuring a composition including the photocurable elastic polymer, it is imparted with high hardness and flexibility, especially preventing damage by external impact to thus ensure high impact resistance.

Examples of the mono- to hexa-functional acrylate monomer may include hydroxyethyl acrylate (HEA), hydroxyethyl methacrylate (HEMA), hexanediol diacrylate (HDDA), tripropylene glycol dicrylate (TPGDA), ethylene glycol dicrylate (EGDA), trimethylolpropane triacrylate (TMPTA), trimethylolpropane ethoxy triacrylate (TMPEOTA), glycerin-propoxylated triacrylate (GPTA), pentaerythritol tetraacrylate (PETA), dipentaerythritol hexaacrylate (DPHA), etc. These mono- to hexa-functional acrylate monomers may be used alone or in combination.

The first photocurable crosslinking copolymer may be a copolymer in which the photocurable elastic polymer is crosslinked with a mono- to hexa-functional acrylate monomer.

According to an embodiment of the present invention, the first photocurable crosslinking copolymer may contain, based on 100 weight parts thereof, about 20 to about 80 weight parts of the photocurable elastic polymer and about 80 to about 20 weight parts of the mono- to hexa-functional acrylate monomer, or about 20 to about 60 weight parts of the photocurable elastic polymer and about 40 to about 80 weight parts of the mono- to hexa-functional acrylate monomer. The presence of the first photocurable crosslinking copolymer in which the photocurable elastic polymer having high elasticity is crosslinked at such a high content enables the first hard coating layer to exhibit high impact resistance and good physical properties.

According to an embodiment of the present invention, the thickness of the first hard coating layer is 50 μm or more, for example, ranges from about 50 to about 300 µm, from about 50 to about 200 µm, from about 50 to about 150 µm, or from about 70 to about 150 µm.

Meanwhile, the first hard coating layer may further include additives such as a surfactant, a yellowing inhibitor, a leveling agent, an antifouling agent and the like, which are typical in the art to which the present invention belongs, in addition to the above-mentioned first photocurable crosslinking copolymer. Here, the amount of the additive may be variously adjusted to the degree that the physical properties of the hard coating film of the present invention are not degraded. Its amount is not particularly limited, but preferably ranges from about 0.1 to about 10 weight parts, based on 100 weight parts of the first photocurable crosslinking copolymer.

According to an embodiment of the present invention, for example, the first hard coating layer may include a surfactant as an additive. The surfactant may be a mono- or bi-functional fluoro-acrylate, a fluorine surfactant or a silicon surfactant. In this context, the surfactant may be contained in a dispersed or crosslinked form in the photocurable crosslinking copolymer. Furthermore, a yellowing inhibitor may be used as an additive. The yellowing inhibitor may be a benzophenone compound or a benzotriazole compound.

The first hard coating layer may be formed by photocuring a first hard coating composition comprising the mono- to hexa-functional acrylate monomer, a photocurable elastic polymer, a photoinitiator, an organic solvent, and optionally an additive after the coating composition is applied onto the supporting substrate.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, etc. Furthermore, the photoinitiator may be commercially available, such as those sold under brand name, Irgacure 184, Irgacure 500, Irgacure 651, Irgacure 369, Irgacure 907, Darocur 1173, Darocur MBF, Irgacure 819, Darocur TPO, Irgacure 907, and Esacure KIP 100F. These photoinitiators may be used alone or in combination.

Examples of the organic solvent may include alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

In the first hard coating composition, the solid fraction including the mono- to hexa-functional acrylate monomer, the photocurable elastic polymer, the photoinitiator, and other additives may be used at a weight ratio of about 70:30 to about 99:1 with regard to the organic solvent. As such, when the first hard coating composition has a high solid content, it increases in viscosity, and thus can allow for a thick coating, for example, forming a first hard coating layer at a thickness of 50 µm or more.

In the hard coating film of the present invention, the second hard coating layer is formed on the other side of the supporting substrate, and includes a second photocurable crosslinking copolymer and inorganic particles dispersed in the second photocurable crosslinking copolymer.

The second photocurable crosslinking copolymer may be a copolymer in which a tri- to hexa-functional acrylate monomer is crosslinked.

Examples of the tri- to hexa-functional acrylate monomer may include trimethylolpropane triacrylate (TMPTA), trimethylolpropane ethoxy triacrylate (TMPEOTA), glycerin-propoxylated triacrylate (GPTA), pentaerythritol tetraacrylate (PETA), dipentaerythritol hexaacrylate (DPHA), etc. These tri- to hexa-functional acrylate monomers may be used alone or in combination.

In one embodiment of the present invention, the second photocurable crosslinking copolymer may be a copolymer in which the tri- to hexa-functional acrylate monomer is crosslink polymerized.

In another embodiment of the present invention, the second photocurable crosslinking copolymer may be a copolymer in which the tri- to hexa-functional acrylate monomer is crosslink polymerized with a mono- to bi-functional acrylate monomer.

Examples of the mono- to bi-functional acrylate monomer may include hydroxyethyl acrylate (HEA), hydroxyethyl methacrylate (HEMA), hexanediol diacrylate (HDDA), tripropylene glycol dicrylate (TPGDA), ethylene glycol dicrylate (EGDA), etc. These mono- to bi-functional acrylate monomers may be used alone or in combination.

When the second photocurable crosslinking copolymer is a copolymer in which a mono- to bi-functional acrylate monomer is crosslinked with a tri- to hexa-functional acrylate monomer, the content ratio of the mono- to bi-functional acrylate monomer and the tri- to hexa-functional acrylate monomer is not particularly limited. In accordance with one embodiment, the weight ratio of the mono- to bi-functional acrylate monomer and the tri- to hexa-functional acrylate monomer may be about 1:99 to about 50:50, about 10:90 to about 50:50, or about 20:80 to about 40:60. Given the amounts of the mono- to bi-functional acrylate monomer and the tri- to hexa-functional acrylate monomer within the ranges set forth above, the hard coating film can be imparted with high hardness and flexibility without deteriorating other physical properties such as a curl property, light resistance, etc.

Also in the hard coating film of the present invention, the second hard coating layer includes inorganic particles dispersed in the second photocurable crosslinking copolymer.

According to an embodiment of the present invention, the inorganic particles may be inorganic nanoparticles having a particle size of about 100 nm or less, about 10 to about 100 nm, or about 10 to about 50 nm. For example, the inorganic particles may include silica particles, aluminum oxide particles, titanium oxide particles or zinc oxide particles.

The inorganic particles may further enhance hardness of the hard coating film.

According to an embodiment of the present invention, the second hard coating layer may contain, based on 100 weight parts thereof, about 40 to about 90 weight parts of the second photocurable crosslinking copolymer and about 10 to about 60 weight parts of the inorganic particles, or about 50 to about weight parts of the second photocurable crosslinking copolymer and about 20 to about 50 weight parts of the inorganic particles. Given the amounts of the second photocurable crosslinking copolymer and the inorganic particles within the ranges set forth above, the hard coating film can be formed with excellent physical properties.

According to an embodiment of the present invention, the second hard coating layer may have a thickness of 50 μm or more, for example, about 50 to about 300 μm, about 50 to about 200 μm, about 50 to about 150 μm, or about 70 to about 150 μm.

Meanwhile, the second hard coating layer may further include a surfactant, a yellowing inhibitor, a leveling agent, an antifouling agent and the like, which are additives typically used in the art to which the present invention belongs, in addition to the above-mentioned second photocurable crosslinking copolymer and inorganic particles. Here, the amount of the additive may be variously adjusted to the degree that the physical properties of the hard coating film of the present invention are not degraded. Its amount is not particularly limited, but preferably ranges from about 0.1 to about 10 weight parts, based on 100 weight parts of the second photocurable crosslinking copolymer.

According to an embodiment of the present invention, for example, the second hard coating layer may include a surfactant as an additive. The surfactant may be a mono- or bi-functional fluoro-acrylate, a fluorine surfactant, or a silicon surfactant. In this context, the surfactant may be contained in a dispersed or crosslinked form in the photocurable crosslinking copolymer. Also, the second hard coating layer may include a yellowing inhibitor as an additive. The yellowing inhibitor may be a benzophenone compound or a benzotriazole compound.

The second hard coating layer may be formed by photocuring a second hard coating composition comprising a binder monomer including the tri- to hexa-functional acrylate monomer, inorganic particles, a photoinitiator, an organic solvent, and optionally an additive.

The photoinitiator used in the second hard coating composition may be the same as or different from that used in the first hard coating composition. For details of the photoinitiator, reference may be made to the description of the first hard coating composition. These photoinitiators may be used alone or in combination.

The organic solvent used in the second hard coating composition may be the same as or different from that used in the first hard coating composition. For details of the organic solvent, reference may be made to the description of the first hard coating composition.

In the second hard coating composition, the solid fraction including the binder monomer, the inorganic particles, the photoinitiator and the other additive may be used at a weight ratio of about 70:30 to about 99:1 with regard to the organic solvent. As such, when the second hard coating composition has a high solid content, it increases in viscosity, and thus can allow for a thick coating, for example, forming a second hard coating layer at a thickness of 50 μm or more.

According to an embodiment of the present invention, the hard coating film of the present invention may further comprise at least one layer, membrane or film, such as a plastic resin film, an adhesive film, a releasable film, an electrically conductive film, an electrically conductive layer, a coating layer, a curable resin layer, a non-conductive film, a metal mesh layer or a patterned metal layer, on at least one of the first hard coating layer and the second hard coating layer. In addition, the layer, membrane or film may take any form such as a monolayer, a bilayer or a lamination. The layer, membrane or film may be constructed on the above hard coating layer by laminating a freestanding film with the aid of an adhesive or an adhesive film, or by coating, deposition, or sputtering, but the present invention is not limited thereto.

Particularly, the layer, membrane or film may be brought into direct contact with the first hard coating layer to allow the hard coating film to improve in resistance against external impact and scratch.

To increase adhesiveness with the layer, membrane or film, the first hard coating layer may be side treated with plasma, corona discharge, or an alkaline solution such as sodium hydroxide or potassium hydroxide.

In the hard coating film according to the present invention, the first and second hard coating compositions may be applied onto one side and the other side of the supporting substrate, respectively, in a sequential or simultaneous manner before photocuring.

According to an embodiment of the present invention, the hard coating film may be manufactured in the following manner.

Specifically, the first hard coating composition containing the above-mentioned components is applied onto one side of the supporting substrate and then photocured to form a first hard coating layer.

Any method that is available in the art may be used in the application of the first hard coating composition to form the first hard coating layer. For example, the hard coating composition containing the above-mentioned components is applied onto one side of the supporting substrate. As such, a process of applying the first hard coating composition is not particularly limited so long as it is useful in the art to which the present invention belongs, and examples thereof may include bar coating, knife coating, roll coating, blade coating, die coating, micro-gravure coating, comma coating, slot die coating, lip coating, solution casting or the like.

Next, the applied first hard coating composition is photocured under UV light to form a first hard coating layer.

UV light may be emitted at a dose of about 20 to about 600 mJ/cm$^2$, or about 50 to about 500 mJ/cm$^2$. Any light source that is used in the art may be applied to the present invention without particular limitation. For example, a high-pressure mercury lamp, a metal halide lamp, a black light fluorescent lamp or the like may be used. The photocuring may be carried out by irradiation of UV light at the dose for about 30 sec to about 15 min, or for about 1 to about 10 min.

After being completely cured, the first hard coating layer may have a thickness of about 50 to about 300 μm, about 50 to about 200 μm, about 50 to about 150 μm, or about 70 to about 150 μm.

According to the present invention, the presence of the first hard coating layer ensures the high hardness of the hard coating film without negatively affecting the curl property.

Subsequently, the second hard coating composition comprising the above-mentioned components is applied onto the other side, that is, the back side of the supporting substrate. Then, the applied second hard coating composition is photocured to form a second hard coating layer after exposure to UV light. During the photocuring of the second hard coating composition, UV light is radiated onto a side opposite the side coated with the first hard coating composition. Accordingly, the curl which may be generated by setting shrinkage in the former photocuring step is counterbalanced to afford a flat hard coating film. No additional flattening processes are thus needed.

UV light may be emitted at a dose of about 20 to about 600 mJ/cm$^2$, or about 50 to about 500 mJ/cm$^2$. Any light source that is used in the art can be applied to the present invention without particular limitation. For example, a high-pressure mercury lamp, a metal halide lamp, a black light fluorescent lamp or the like may be used. The photocuring may be carried out by irradiation of UV light at the dose for about 30 sec to about 15 min, or for about 1 to about 10 min.

After being completely cured, the second hard coating layer may have a thickness of about 50 to about 300 μm, about 50 to about 200 μm, about 50 to about 150 μm, or about 70 to about 150 μm.

In the method of manufacturing the hard coating film according to one embodiment, coating and photocuring steps of the first hard coating composition may be performed in advance of or following those of the second hard coating composition.

For use as a cover for mobile terminals or tablet PCs, the hard coating film must have hardness or impact resistance elevated sufficiently to be a substitute for glass. Even when formed at a high thickness on the substrate, the hard coating layer of the present invention is less prone to curling or cracking, and imparts high transparency and impact resistance to the hard coating film.

The hardness and impact resistance of the hard coating film of the present invention are high enough to be a substitute for glass. For example, the hard coating film of the present invention may not crack even after a steel ball weighing 22 g is freely dropped ten times from a height of 50 cm thereto.

In addition, the second hard coating layer in the hard coating film of the present invention may have a pencil hardness of 7H or more, 8H or more, or 9H or more at a load of 1 kg.

Furthermore, after the second hard coating layer in the hard coating film of the present invention is tested by double rubbing 400 times with a steel wool #0000 under a load of 500 g on a friction tester, only two or less scratches may appear.

Also, the hard coating film of the present invention may have a light transmittance of 91.0% or more, or 92.0% or more, and a haze of 1.0% or less, 0.5% or less, or 0.4% or less.

Also, the hard coating film of the present invention may have an initial color b value of 1.0 or less. After the hard coating film is exposed to UV-B under an ultraviolet lamp for 72 hr or longer, it may have a color b* value which differs from the pre-exposed color b* value by 0.5 or less, or by 0.4 or less.

Also, when the hard coating film of the present invention is disposed on a plane after exposure to a temperature of 50° C. or higher at a humidity of 80% or higher for 70 hr or longer, the maximum distance at which each edge or side of the hard coating film is spaced apart from the plane may be about 1.0 mm or less, about 0.6 mm or less, or about 0.3 mm or less. More particularly, when the hard coating film of the present invention is disposed on a plane after exposure to a temperature of 50 to 90° C. at a humidity of 80 to 90% for 70 to 100 hr, each edge or side of the hard coating film is spaced apart from the plane by about 1.0 mm or less, about 0.6 mm or less, or about 0.3 mm or less, maximally.

The hard coating film of the present invention exhibits excellent physical properties including hardness, impact resistance, scratch resistance, transparency, durability, light resistance and light transmittance, and thus has useful applications in various fields. For instance, the hard coating film of the present invention can be utilized variously. For example, the hard coating film of the present invention can be used in the touch panels of mobile terminals, smart phones or tablet PCs, and as covers or device panels for various displays.

A better understanding of the present invention may be obtained through the following examples which are set forth to illustrate, but are not to be construed as limiting the present invention.

EXAMPLES

Preparation Example 1: Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck], 110 mg of hydroquinone monomethylene ether, and 315 g of methyl ethyl ketone. Then, the mixture was reacted at 70° C. for 5 hr to obtain polyrotaxane in which polylactone with an acrylate moiety conjugated to the end thereof acting as the macrocycle while cyclodextrin was positioned as the stopper.

The polyrotaxane had a weight average molecular weight of 600,000 g/mol, and was found to have an elongation of 20%, as measured by ASTM D638.

Example 1

A first hard coating composition was prepared by mixing 6 g of trimethylolpropane triacrylate (TMPTA), 4 g of the polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430) and 1 g of methyl ethyl ketone.

A second hard coating composition was prepared by mixing g of hydroxyethyl acrylate (HEA), 8 g of a silica-dipentaerythritolhexaacrylate (DPHA) composite in which silica nanoparticles with a particle size of 20~30 nm were dispersed by 40 wt % (silica 3.2 g, DPHA 4.8 g), 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied onto a PET substrate 188 μm thick with a size of 15 cm×20 cm, and then subjected to first photocuring by exposure to 280~350 nm UV light using a black light fluorescent lamp.

Subsequently, the first hard coating composition was applied onto the back side of the substrate, and then subjected to second photocuring by exposure to 280~350 nm UV light using a black light fluorescent lamp to give a hard coating film. After completion of the curing, each of the first and second hard coating layers formed on both sides of the substrate was 100 μm thick.

Example 2

A hard coating film was manufactured in the same manner as in Example 1, with the exception that 4 g of a urethane acrylate polymer (brand name: UA200PA, Shin Nakamura Chemical Co. Ltd., weight average molecular weight: 2,600 g/mol, elongation measured by ASTM D638: 170%) was used instead of 4 g of the polyrotaxane of Preparation Example 1 in the first hard coating composition.

Example 3

A hard coating film was manufactured in the same manner as in Example 1, with the exception that 4 g of a urethane acrylate polymer (brand name: UA340P, Shin Nakamura Chemical Co. Ltd., weight average molecular weight: 13,000 g/mol, elongation measured by ASTM D638: 150%) was used instead of 4 g of the polyrotaxane of Preparation Example 1 in the first hard coating composition.

Example 4

A hard coating film was manufactured in the same manner as in Example 1, with the exception that 8 g of a silica-trimethylolpropane triacrylate (TMPTA) composite in which silica nanoparticles with a particle size of 20~30 nm were dispersed by 40 wt % (silica 3.2 g, TMPTA 4.8 g) was used instead of 8 g of the silica-dipentaerythritolhexaacrylate (DPHA) composite in which silica nanoparticles with a particle size of 20~30 nm were dispersed by 40 wt % in the second hard coating composition.

Example 5

A hard coating film was manufactured in the same manner as in Example 1, with the exception that the thickness of each of the first and second hard coating layers formed on both sides of the substrate after completion of the curing in Example 1 was 150 μm thick.

Example 6

A first hard coating composition was prepared by mixing 5 g of trimethylolpropane triacrylate (TMPTA), 5 g of the polyrotaxane of Preparation Example 1, 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methyl ethyl ketone.

A second hard coating composition was prepared by mixing g of hydroxyethyl acrylate (HEA), 8 g of a silica-dipentaerythritolhexaacrylate (DPHA) composite in which silica nanoparticles with a particle size of 20~30 nm were dispersed by 40 wt % (silica 3.2 g, DPHA 4.8 g), 0.2 g of a photoinitiator (brand name: Darocur TPO), 0.1 g of a benzotriazole-based yellowing inhibitor (brand name: Tinuvin 400), and 0.05 g of a fluorine surfactant (brand name: FC4430).

The second hard coating composition was applied onto a PET substrate 188 μm thick with a size of 15 cm×20 cm, and then subjected to first photocuring by exposure to 280~350 nm UV light using a black light fluorescent lamp.

Subsequently, the first hard coating composition was applied onto the back side of the substrate, and then subjected to second photocuring by exposure to 280~350 nm UV light using a black light fluorescent lamp to give a hard coating film. After completion of the curing, the first hard coating layer was 125 μm thick, and the second hard coating layer was 100 μm thick.

Comparative Example 1

The second hard coating composition of Example 1 was applied onto a PET substrate 188 μm thick with a size of 15 cm×20 cm, and then subjected to first photocuring by exposure to 280~350 nm UV light using a black light fluorescent lamp.

Subsequently, the second hard coating composition of Example 1 was applied to the back side of the substrate, and then subjected to second photocuring by exposure to 280~350 nm UV light using a black light fluorescent lamp to give a hard coating film. After completion of the curing, each of the first and the second hard coating layers formed on both sides of the substrate was 100 μm thick.

Comparative Example 2

A first hard coating composition was prepared by mixing 10 g of trimethylolpropane triacrylate (TMPTA), 0.2 g of a photoinitiator (brand name: Darocur TPO), 0.1 g of a benzotriazole-based yellowing inhibitor (brand name: Tinuvin 400), 0.05 g of a fluorine surfactant (brand name: FC4430), and 1 g of methyl ethyl ketone.

Preparation of a second hard coating composition and the other processes were performed in the same manner as in Example 1 to give a hard coating film.

The main components of the hard coating films of Examples 1 to 6 and Comparative Examples 1 and 2 are summarized in Table 1 below.

TABLE 1

| | 1st Hard Coating Layer | | | | 2nd Hard Coating Layer | | |
| | Photocurable | | | | | | |
| No. | Acrylate Monomer | Elastic Polymer | Inorganic Particles | Thick. | Acrylate Monomer | Inorganic Particles | Thick. |
|---|---|---|---|---|---|---|---|
| Ex. 1 | TMPTA 6 g | Polyrotaxane 4 g | — | 100 μm | DPHA 4.8 g, HEA 2 g | 3.2 g | 100 μm |
| Ex. 2 | TMPTA 6 g | UA200PA 4 g | — | 100 μm | DPHA 4.8 g, HEA 2 g | 3.2 g | 100 μm |
| Ex. 3 | TMPTA 6 g | UA340P 4 g | — | 100 μm | DPHA 4.8 g, HEA 2 g | 3.2 g | 100 μm |
| Ex. 4 | TMPTA 6 g | Polyrotaxane 4 g | — | 100 μm | TMPTA 4.8 g, HEA 2 g | 3.2 g | 100 μm |
| Ex. 5 | TMPTA 6 g | Polyrotaxane 4 g | — | 150 μm | DPHA 4.8 g, HEA 2 g | 3.2 g | 150 μm |
| Ex. 6 | TMPTA 5 g | Polyrotaxane 5 g | — | 125 μm | DPHA 4.8 g, HEA 2 g | 3.2 g | 100 μm |
| C. Ex. 1 | DPHA 4.8 g, HEA 2 g | — | 3.2 g | 100 μm | DPHA 4.8 g, HEA 2 g | 3.2 g | 100 μm |
| C. Ex. 2 | TMPTA 10 g | — | 3.2 g | 100 μm | DPHA 4.8 g, HEA 2 g | 3.2 g | 100 μm |

Test Examples

Measurement Method

1) Pencil Hardness

The second hard coating layer was evaluated for pencil hardness according to the Japanese Standard JIS K5400. In this regard, the second hard coating layer of the hard coating film was doubly rubbed three times with a pencil hardness meter under a load of 1.0 kg to determine the hardness at which no scratches appeared.

2) Scratch Resistance

The second hard coating layer of the hard coating film was doubly rubbed 400 times with a steel wool (#0000) under a load of 0.5 kg on a friction tester, and scratches thus formed on the second hard coating layer were counted. Evaluation was made of the scratch resistance of the films by marking ○ for two or less scratches, A for two to less than five scratches, and X for five or more scratches.

3) Light Resistance

Differences in color b value of the hard coating films were measured before and after exposure to UV-B from UV lamp for 72 hr or longer.

4) Transmittance and Haze

The hard coating films were measured for transmittance and haze using a spectrophotometer (brand name: COH-400).

5) Curl Property at High Humidity and Temperature

After a hard coating film piece with dimensions of 10 cm×10 cm was stored for 72 hrs in a chamber maintained at a temperature of 85° C. and a humidity of 85%, it was placed on a flat plane. A maximal distance at which each edge of the piece was apart from the plane was measured.

6) Cylindrical Bending Test

Each of the hard coating films was wound on a cylindrical mandrel having a diameter of 1 cm such that the first hard coating layer was positioned as the outermost layer. When the hard coating film was not cracked, it was evaluated as OK. If the hard coating film was cracked, it was evaluated as X.

7) Impact Resistance

The impact resistance of each of the hard coating films was evaluated by determining whether or not each of the hard coating films was cracked when a 22 g steel ball was freely dropped 10 times on the second hard coating layer from a height of 50 cm. Each of the hard coating films was evaluated as OK when it was not cracked, and as X when cracked.

The results of the physical properties measured in each of the hard coating films are summarized in Table 2 below.

As is apparent from Table 2, the hard coating films of Examples 1 to 6 were good in all the physical properties. In contrast, the hard coating films of Comparative Examples 1 and 2, without the second hard coating layer comprising a second photocurable crosslinking copolymer of a mono- to hexa-functional acrylate monomer and a photocurable elastic polymer, had insufficient impact resistance.

What is claimed is:

1. A hard coating film, comprising:
   a supporting substrate;
   a first hard coating layer, formed on one side of the supporting substrate and including a first photocurable crosslinking copolymer; and
   a second hard coating layer, formed on the other side of the supporting substrate and including a second photocurable crosslinking copolymer and inorganic particles dispersed in the second photocurable crosslinking copolymer,
   wherein the first photocurable crosslinking copolymer is a copolymer in which a photocurable elastic polymer is crosslinked with a mono- to hexa-functional acrylate monomer, and the photocurable elastic polymer has an elongation of 15 to 200%, as measured by ASTM D638, and
   the second photocurable crosslinking copolymer is a copolymer in which a tri- to hexa-functional acrylate monomer is crosslinked with a mono- to bi-functional acrylate monomer,
   wherein the hard coating film exhibits a pencil hardness of 7H or more at a load of 1 kg.

2. The hard coating film of claim 1, wherein the photocurable elastic polymer comprises at least one selected from the group consisting of polycaprolactone, a urethane acrylate polymer and polyrotaxane.

3. The hard coating film of claim 2, wherein the polyrotaxane comprises a cyclic moiety (macrocycle) in which lactone compounds with a (meth)acrylate moiety conjugated to the end thereof are bonded to each other; a thread moiety held within the macrocycle; and stoppers provided at both ends of the thread moiety so as to prevent dissociation of the macrocycle.

4. The hard coating film of claim 1, wherein the first photocurable crosslinking copolymer comprises, based on 100 weight parts thereof, 20 to 80 weight parts of the photocurable elastic polymer and 20 to 80 weight parts of the mono- to hexa-functional acrylate monomer, which are copolymerized.

5. The hard coating film of claim 1, wherein the second hard coating layer comprises, based on 100 weight parts

TABLE 2

|  | Ex. 1 | Ex. 2 | Ex. 3 | Ex. 4 | Ex. 5 | Ex. 6 | C . Ex. 1 | C. Ex. 2 |
| --- | --- | --- | --- | --- | --- | --- | --- | --- |
| Pencil Hardness | 9H | 9H | 9H | 8H | 9H | 9H | 9H | 9H |
| Scratch Resistance | ○ | ○ | ○ | ○ | ○ | ○ | Δ | ○ |
| Light Resistance | 0.20 | 0.24 | 0.21 | 0.18 | 0.25 | 0.20 | 0.20 | 0.16 |
| Transmittance | 92.1 | 92.3 | 92.0 | 92.5 | 92.0 | 92.2 | 92.2 | 92.1 |
| Haze | 0.3 | 0.4 | 0.3 | 0.3 | 0.4 | 0.3 | 0.4 | 0.3 |
| Bending Test | OK | OK | OK | OK | OK | OK | OK | X |
| Curl property at High Humidity & Temperature | 0.4 mm | 0.4 mm | 0.3 mm | 0.2 mm | 0.4 mm | 0.5 mm | 0.3 mm | 0.6 mm |
| Impact Resistance | OK | OK | OK | OK | OK | OK | X | X | thereof, 40 to 90 weight parts of the second photocurable elastic polymer and 10 to 60 weight parts of the inorganic particles.

6. The hard coating film of claim 1, wherein the mono- to hexa-functional acrylate monomer comprises at least one selected from the group consisting of hydroxyethyl acrylate (HEA), hydroxyethyl methacrylate (HEMA), hexandiol diacrylate (HDDA), tripropylene glycol dicrylate (TPGDA), ethylene glycol dicrylate (EGDA), trimethylolpropane triacrylate (TMPTA), trimethylolpropane ethoxy triacrylate (TMPEOTA), glycerin-propoxylated triacrylate (GPTA), pentaerythritol tetraacrylate (PETA) and dipentaerythritol hexaacrylate (DPHA).

7. The hard coating film of claim 1, wherein the supporting substrate includes at least one selected from consisting of polyethyleneterephthalate (PET), ethylene vinyl acetate (EVA), a cyclic olefin polymer (COP), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) and a fluorine resin.

8. The hard coating film of claim 1, wherein thicknesses of the first and second hard coating layers are the same or different, and independently range from 50 to 300 μm.

9. The hard coating film of claim 1, wherein the hard coating film does not crack when a 22 g steel ball is freely dropped ten times thereon from a height of 50 cm.

10. The hard coating film of claim 1, wherein the hard coating film allows two or less scratches to appear thereon after it is doubly rubbed 400 times with a steel wool #0000 under a load of 500 g.

11. The hard coating film of claim 1, having a light transmittance of 91% or more, a haze of 0.4 or less, and a color b* value of 1.0 or less.

12. The hard coating film of claim 1, wherein the hard coating film has a color b* value after exposure to UV-B for 72 hrs which differs from a pre-exposed, color b* value by 0.5 or less.

13. The hard coating film of claim 1, wherein when the hard coating film is disposed on a plane after exposure to a temperature of 50° C. or higher at a humidity of 80% or higher for 70 hr or longer, each edge or side of the hard coating film is spaced apart from the plane by 1.0 mm or less, maximally.

14. The hard coating film of claim 1, further comprising on the first hard coating layer or the second hard coating layer at least one layer selected from the group consisting of a plastic resin film, an adhesive film, a releasable film, an electrically conductive film, an electrically conductive layer, a coating layer, a curable resin layer, a non-conductive film, a metal mesh layer and a patterned metal layer.

* * * * *